United States Patent [19]

Weichel

[11] 3,885,746
[45] May 27, 1975

[54] APPARATUS FOR REMOVING MATERIAL FROM A ROTATING SURFACE

[76] Inventor: Ernst Weichel, Bahnhofstrasse 1, 7326 Heiningen, Germany

[22] Filed: May 22, 1973

[21] Appl. No.: 362,846

[30] Foreign Application Priority Data
May 25, 1972  Germany............................ 2225388

[52] U.S. Cl.............................. 241/279; 241/101.5
[51] Int. Cl............................................ B02c 18/22
[58] Field of Search........... 241/3, 30, 101 R, 101.2, 241/101.4, 101.5, 222, 224, 225, 279; 198/36, 53 A, 124; 221/116, 117

[56] References Cited
UNITED STATES PATENTS

| | | | |
|---|---|---|---|
| 453,966 | 6/1891 | Dodge............................. | 198/124 X |
| 3,509,925 | 5/1970 | Weichel.......................... | 241/279 X |

*Primary Examiner*—Granville Y. Custer, Jr.
*Attorney, Agent, or Firm*—Toren, McGeady and Stanger

[57] ABSTRACT

A pivotally mounted conveyor is associated with a pair of laterally spaced turntables so that the conveyor, with a cutting edge positioned on it, can be selectively pivoted over each of the turntables. As stalk and leaf material is removed from one turntable by the cutting disc and is moved along the conveyor, the other turntable can be loaded with material to afford a continuous operation by switching the conveyor between the two. Instead of a single cutting disc, the conveyor can be provided with two cutting discs, one for each of the turntables in carrying out the material cutting and removal operation. An additional conveyor can be pivotally mounted at the discharge end of the conveyor supporting the cutting disc so that the material can be selectively directed to different discharge positions for supplying different use or storage locations.

7 Claims, 7 Drawing Figures

APPARATUS FOR REMOVING MATERIAL FROM A ROTATING SURFACE

SUMMARY OF THE INVENTION

The present invention is directed to an apparatus for removing stalk and leaf material from a rotating support surface and, more particularly, it is directed to a pivotally mounted conveyor for alternately removing the material from a pair of support surfaces each located adjacent an opposite side of the conveyor.

Devices are known which consist of a driven turntable and a pivotally mounted conveyor having a cutting disc at its free end with the conveyor pivotally displaceable over the surface of the turntable for removing material along the conveyor after it has been detached by the cutting disc. The cutting disc removes stalk and leaf material from the lateral edge of a pile of such material positioned on the support surface of the turntable. After being detached by the cutting disc, the material moves through a discharge duct on the conveyor and is transferred to known following machines. During the removal of the material from the surface of the turntable, the conveyor along with its cutting element is moved gradually inwardly from the outer edge of the turntable toward its center until the entire pile of material on the turntable is removed.

The primary object of the present invention is to improve the known devices so that the removal output can be increased and stoppages in loading the following machines, caused by unloading material from a truck onto the surface of the turntable, can be reduced to a minimum.

Therefore, in accordance with the present invention, the increased output is achieved by using one or a pair of cutting elements or discs positioned on the end of a pivotally mounted conveyor which is associated with two rotatable turntables arranged in side-by-side relationship so that as one of the tables is emptied of material by the cutting element and conveyor, the other turntable can be charged or loaded with material from a truck. Further, the discharge from the conveyor can be arranged for directing the material into different conveyor devices.

Preferably, the conveyor is equipped with a cutting element turning about an axis extending in the longitudinal direction of the conveyor and, further, the cutting element is driven by a motor so that its direction of rotation can be reversed to accommodate removal from the two adjacent turntables.

A pair of oppositely rotating feed drums are preferably associated with the cutting element, each located on an opposite side of the conveyor, and provided with prongs which extend through slots in a covering extending along the side of the conveyor so that the prongs engage the material detached by the cutting disc and direct it into the discharge duct located on the conveyor. A packing device is located along the discharge duct and has packing elements extending into the duct from the top to the bottom for compressing the material and advancing it through the duct.

Another feature of the invention is the provision of a pivot axis for the conveyor and its cutting disc and feed drums so that the conveyor can be pivoted in both directions across the surfaces of the turntables until the cutting disc is close to the structure defining the center of the turntable.

It is advantageous if the cutting disc can also be turned about an axis spaced from the axis of the conveyor for displacing the cutting disc in opposite directions. Moreover, in this arrangement it is also advantageous if the cutting disc can be locked as it removes material from one of the turntables.

In another embodiment of the invention, a pair of cutting elements or discs are provided on the conveyor each associated with a different feed drum.

In still another embodiment of the invention, a pair of parallel feed or discharge ducts extend along the conveyor and each duct is associated with a different cutting disc and feed drum.

A particularly important characteristic of the invention is the use of an additional pivotally mounted conveyor or feed belt forming a continuation from the discharge end of the conveyor. The additional conveyor is pivotally mounted about an axis adjacent the pivot axis of the first conveyor so that it can form a rectilinear continuation of the conveyor or can be turned into a number of additional positions for discharging the material into different following machines or conveyor devices.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
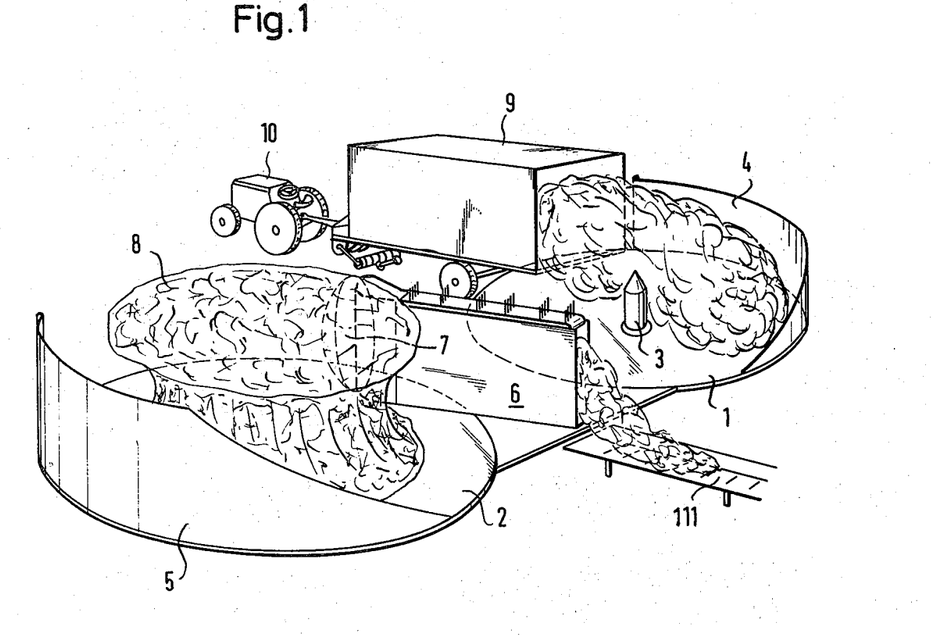
FIG. 1 is a schematic perpsective view of apparatus embodying the present invention.

In FIG. 1 a pair of turntables 1 and 2 are shown in side-by-side relationship so that their peripheral surfaces are in spaced relationship. A truck 9 pulled by a tractor 10 is positioned for unloading material onto the support surface of the turntable 1. During unloading, the material is prevented from falling off the turntable by an upwardly extending boundary wall 4 located along a portion of the peripheral edge of the turntable 1.

While turntable 1 is charged with leaf and stalk material, a conveyor 6 is moved inwardly over the support surface of the second turntable 2 so that its cutting disc 7 removes the edge of the pile 8 of partly cut material. The material separated by the cutting edge is then directed through the conveyor 6 and is transferred to a second conveyor 11.

Figure 2:
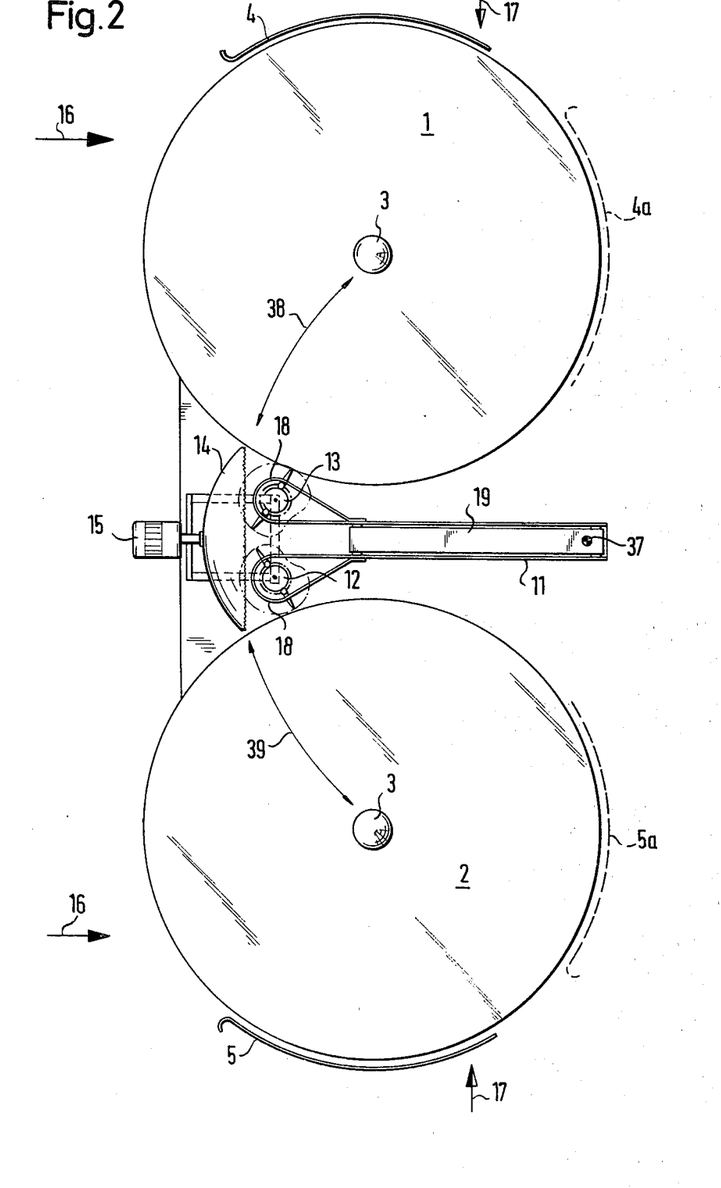
FIG. 2 is a schematic top view of an apparatus embodying the present invention and similar to that shown in FIG. 1.

As can be readily appreciated, after the pile 8 of material has been removed from the turntable 2, the conveyor 6 can be pivoted into position over turntable 1 for removing the material dumped from the truck 9. As the conveyor commences removing the material from turntable 1 another truck 9 can unload material onto turntable 2 directing the material against a boundary wall 5 on that turntable similar to the boundary wall 4 on the other turntable. As shown in FIG. 2, a conveyor 11 is equipped with a cutting element 14 which rotates about an axis extending in the longitudinal direction of the conveyor. The cutting element or disc is driven by a motor 15 and can be switched for rotation in two different directions, that is, for removing the material from the two turntables 1, 2. Along each of the longitudinally extending sides of the conveyor adjacent the cutting disc 14 are feed drums 12, 13 which rotate in opposite directions for cooperation with the cutting disc in directing material along the conveyor. The feed drums 12, 13 have outwardly extending prongs which extend through slots in a covering 18 extending along the side of the conveyor between the feed drum and the material being removed from the turntable. As the material is cut by the disc 14 it is engaged by the prongs on the feed drum pushed into a discharge duct extending along the conveyor 11. A packing device 19 is associated with the discharge duct and has packing elements which extend into the duct from its top to bottom for slightly compressing the material and advancing it toward the discharge end of the conveyor.

In FIG. 2, the arrows 16 represent the direction in which the turntables 1 and 2 are loaded when boundary walls 4 and 5 are positioned as shown in solid lines.

If the boundary walls 4a, 5a are arranged in the positions indicated by the broken lines, the turntables 1 and 2 are loaded in the direction indicated by arrows 17.

The conveyor 11 along with its cutting disc 14 and the feed drums 12 and 13 can be pivoted about an axis 37 in the direction of the arrows 38 and 39, that is, until the cutting disc is moved inwardly toward a column 3 defining the center of the turntables 1, 2. By permitting the conveyor and its cutting disc to move inwardly across the support surfaces of the turntables 1 and 2, it is possible to remove almost all of the material from the turntables.

As can be noted in FIG. 2 and as is true for the other embodiments, the conveyor 11 when located in the non-operating position between the two turntables, has its longitudinal axis extending approximately perpendicularly to the line connecting the centers of the two turntables.

Figure 3:
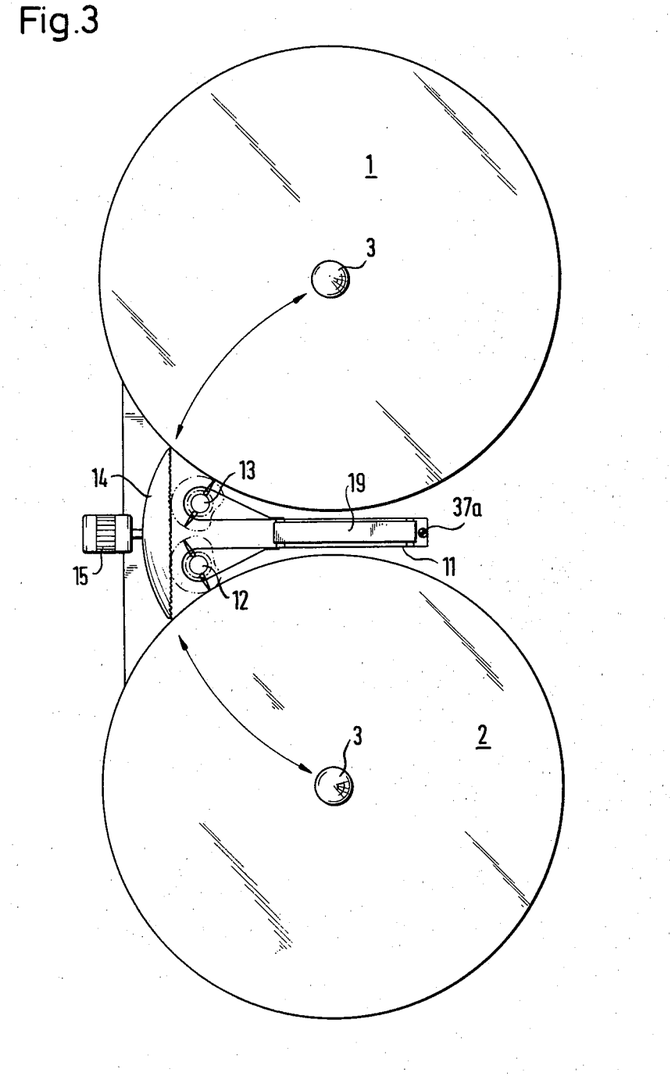
FIG. 3 is a schematic top view of another embodiment of the invention slightly different from that shown in FIG. 2.

In the embodiment illustrated in FIG. 3, the length of the conveyor 11 relative to the diameters of the turntables 1 and 2 is shorter and the conveyor turns about an axis 37a providing a shorter turning circle. Nevertheless, the cutting disc 14 can be displaced over either of the turntables, through a wider angle, so that the cutting disc moves inwardly to a point adjacent the center post or column 3 on each of the turntables.

Figure 4:
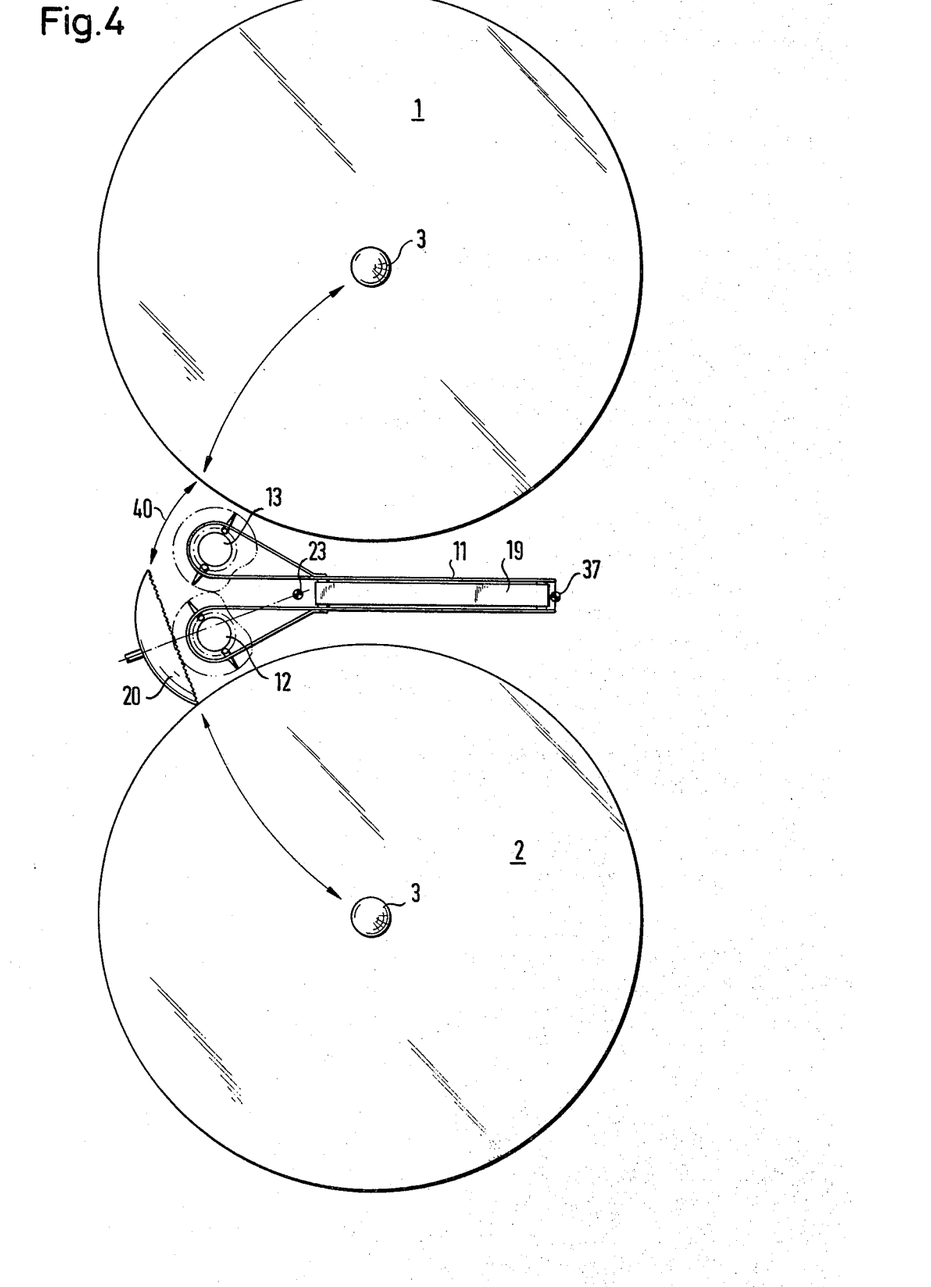
FIG. 4 is a schematic top view of a further embodiment of the present invention.

In FIG. 4, in addition to the pivot axis for the conveyor 11, a cutting disc 20 is provided at the end of the conveyor so that it can be pivoted about a separate axis 23. As indicated, the cutting disc 20 can be moved in the directions of arrow 40 and can be locked as long as it works in removing material from the same turntable 1 or 2. With this double pivot axis arrangement, the cutting disc can be placed into favorable engagement with the pile of material supported on the turntable. As distinguished from the conveyor arrangements in which a single cutting disc is positioned on the end of the conveyor, in FIG. 5 two separate cutting elements 21, 22 are arranged on the conveyor so that each is associated with a different feed drum 12 and 13. In other words, the cutting element 21 and the feed drum 13 cooperate in remvoing the material from turntable 1 while cutting element 22 and feed drum 12 cooperate in removing the material from turntable 2.

Figure 5:
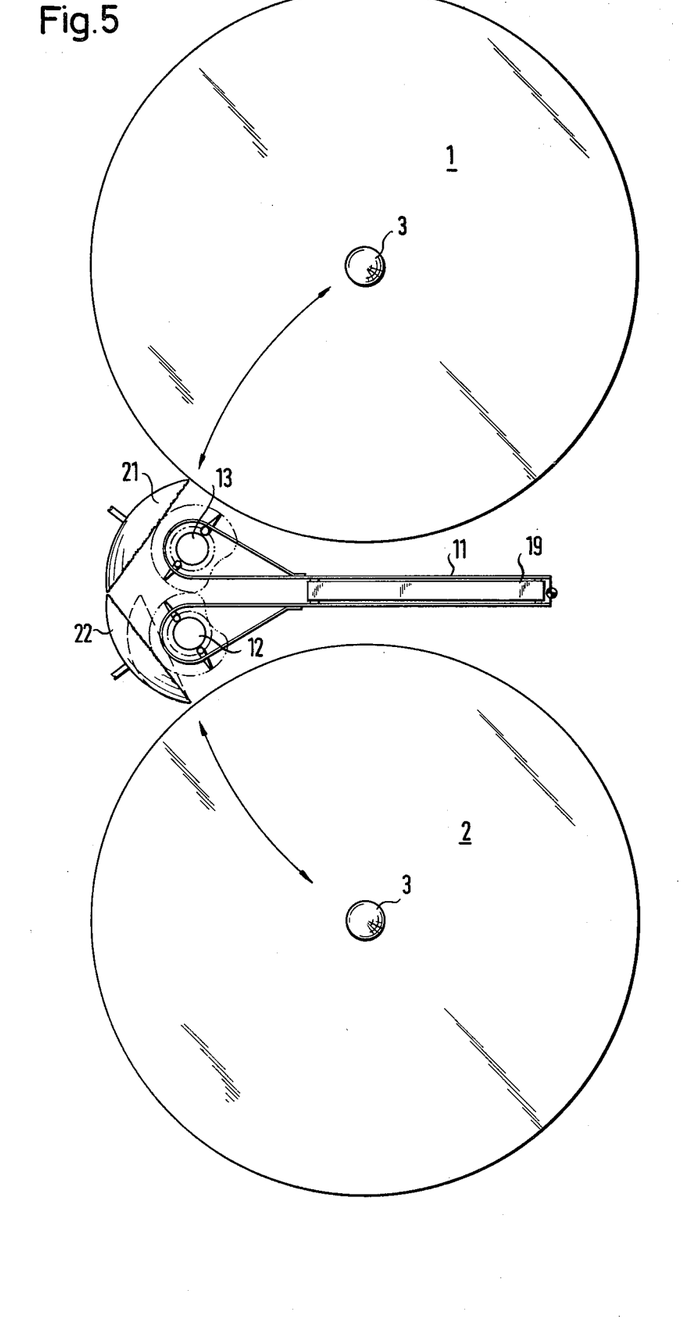
FIG. 5 is a schematic top view of still another embodiment of the present invention.
Figure 6:
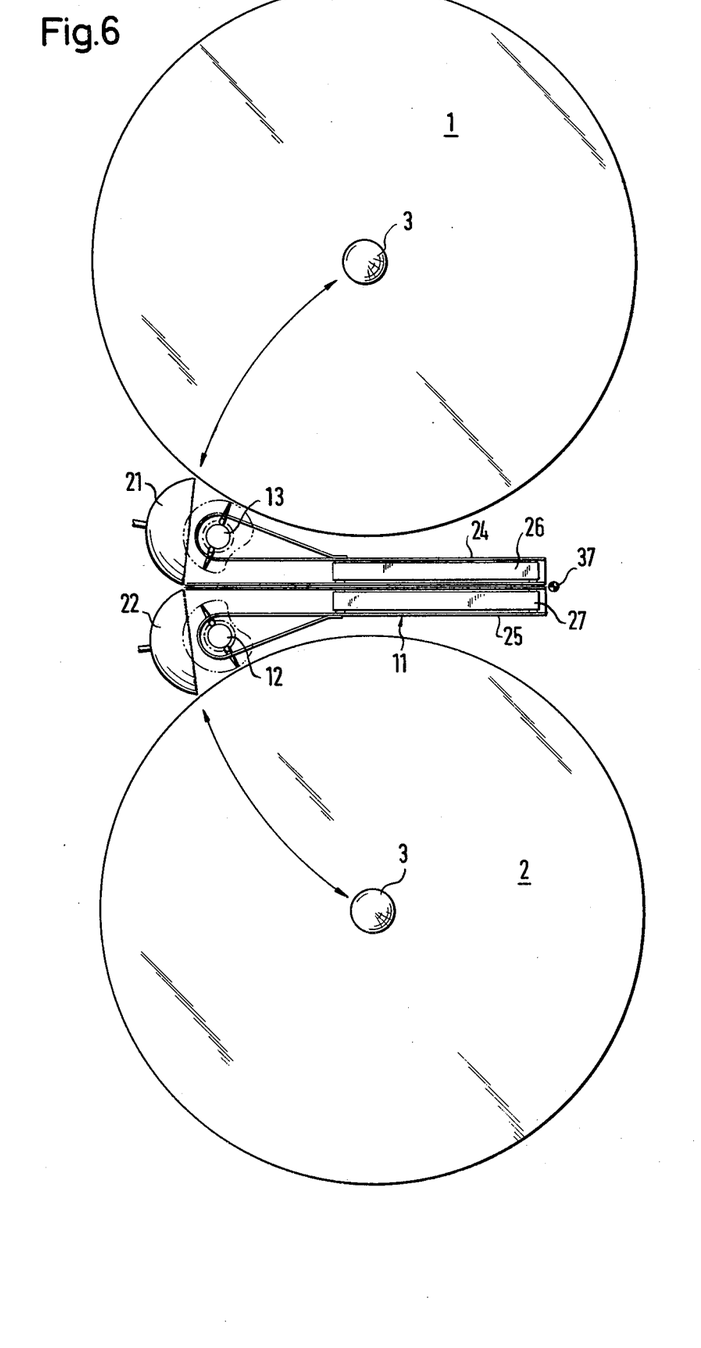
FIG. 6 is a schematic top view of yet another embodiment of the present invention.

In FIG. 6 the arrangement is similar to FIG. 5, however, a pair of parallel feed ducts 24 and 25 extend along the conveyor from adjacent the feed drums to the discharge end of the conveyor at which the pivot axis 37 for the conveyor is located. The feed duct 24 is associated with the feed drum 13 and the cutting disc 21 in removing material from turntable 1 and feed duct 25 is associated with feed drum 12 and cutting disc 22 in removing the material from turntable 2. Accordingly, it is possible to disconnect feed duct 25 and cutting disc 22 while material is being removed from truntable 1. A packer member 26 is associated with the feed ducts and when a feed duct is not being used its packer can similarly be taken out of operation. In other words, while half of the apparatus on the conveyor is removing material from one of the turntables, the other half of the apparatus can be disconnected, since it does not provide any of the cutting and feeding operation.

Figure 7:
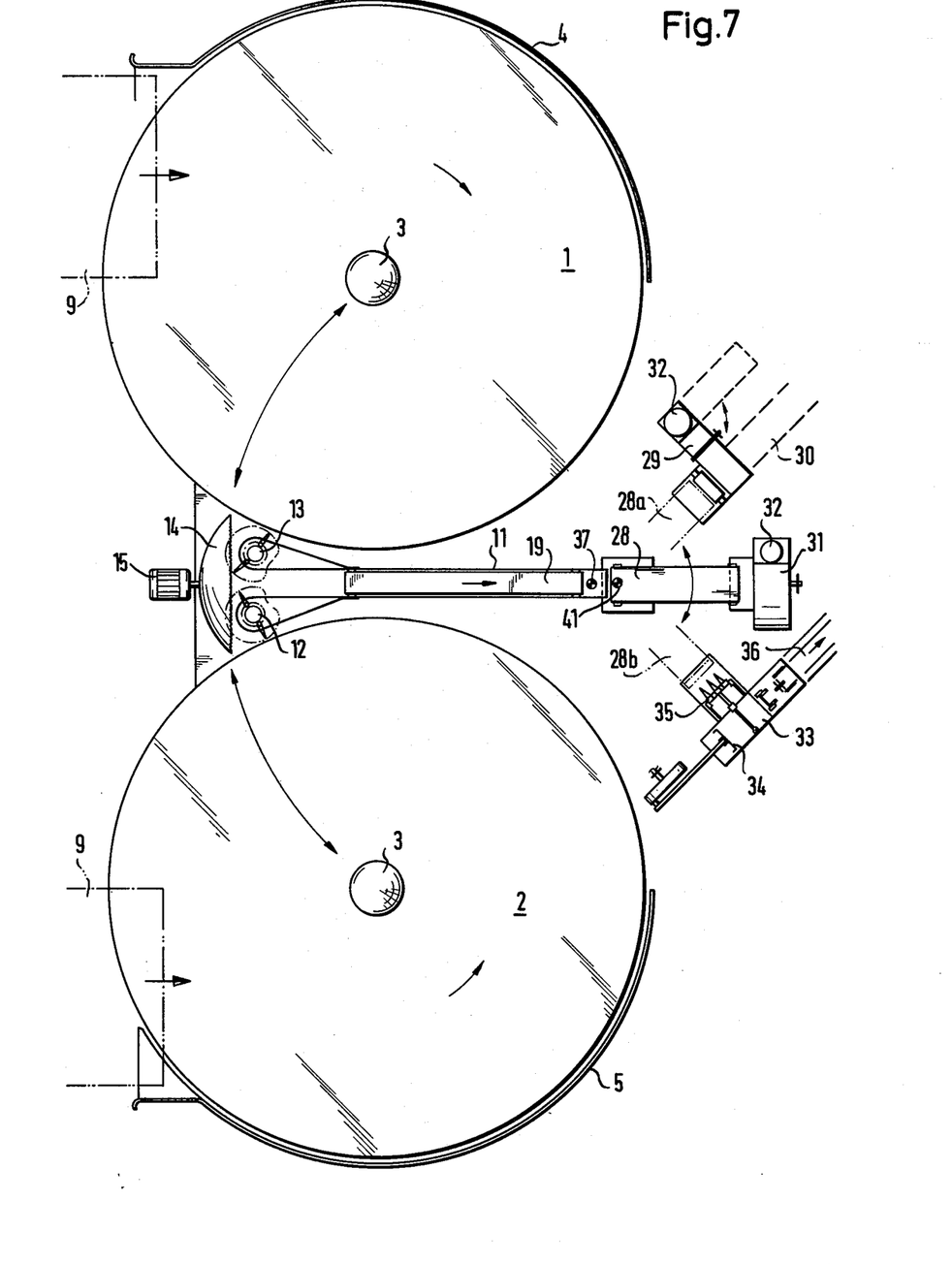
FIG. 7 is a scehmatic top view of yet another embodiment of the present invention with an additional following conevyor device.

In FIG. 7, which is similar to FIG. 2, an additional or second conveyor or feed belt 28 is aligned and extends from the discharge end of the conveyor 11. The end of the feed belt 28 adjacent the conveyor 11 is closely spaced from the pivot axis 37 of the first conveyor. The second conveyor or feed belt 28 is also pivotally mounted so that it can be pivotally displaced relative to the conveyor 11 for further transporting the material to a variety of discharge points. As indicated in FIG. 7, the feed belt 28 can provide a rectilinear continuation of conveyor 11, that is when it is in its centered position between the turntables and in this aligned position the feed belt 28 terminates at a blower 31 which feeds the material into a delivery pipe 32. In addition the feed belt 28 can be pivoted about its end adjacent the conveyor 11 into position 28a for transferring the material into a chopper 29 or onto a conveyor belt 30 located below its discharge end. The chopper 29 directs the material into the pneumatic pipeline 32.

It is also possible to pivot the feed belt 28 into position 28b so that it feeds the material through a packer 35 into a stationary press 33 equipped with a piston 34. The press 33 is arranged so that it not only compresses the material continuously supplied to it, but it can also tie and feed the material through the duct 36 and adjoining chutes, bale conveyors and the like.

It should be appreciated that the same or different types of material can be deposited on the surfaces of the turntables 1 and 2 in any desired order, and the material can be removed mechanically by simply pivotally displacing the conveyor 11 and cutting disc 14 over the respective turntable 1 or 2. Moreover, by pivoting the conveyor belt 28, shown in FIG. 7, the material can be selectively directed to a chopper, a conveyor belt, a blower or a stationary press. In this manner the material can be processed and transported as desired, without the necessity of time-consuming alterations on the following machines or delivery pipes at the discharge ends of the conveyor.

A load of green fodder can be fed, for example, from a silo onto one of the turntables 1 and 2 and then directed, at certain feeding times, without any modification over the conveyor belt 30 to the fodder table or crib in an adjoining stable. This operation can be carried out without the continuous filling of the silo being interrupted due to a change-over operation.

Since the invention saves on working and setting-up times, apart from the automatic removal of material from the turntables, and leads to a reduction in the cost of harvesting and farm machinery, it represents considerable progress in this type of apparatus.

While specific embodiments of the invention have been shown and described in detail to illustrate the application of the inventive principles, it will be understood that the invention may be embodied otherwise without departing from such principles.

I claim:

1. Apparatus for removing a pile of stalks and leaves located on the support surface of a rotatably driven turntable and a conveyor pivotally displaceable across the support surface of said turntable, a cutting disc mounted on said conveyor and arranged to cut material from the pile of material on the support surface of said turntable, a discharge duct formed on said conveyor and arranged to receive and transport the material removed by said cutting disc, said conveyor along with its said cutting disc is arranged to be displaced from the periphery to the center of said turntable as said turntable rotates for removing material located on the support surface, wherein the improvement comprises two said turntables disposed in side-by-side relationship with the adjacent peripheral surfaces of said turntables disposed in spaced relationship, said conveyor being longitudinally elongated and extending between the adjacent peripheral surfaces of said turntables, said conveyor being pivotally displaceable inwardly from the peripheral surfaces alternately over each of the support surfaces of said turntables, so that said conveyor and cutting disc can remove material from one said turntable while the other said turntable can be loaded, said conveyor extending from said turntable for moving the removed material to a selected disposal location, said cutting disc on said conveyor rotating about an axis extending in the longitudinal direction of said conveyor, and a motor operatively connected to said cutting disc for selectively driving it in opposite directions about its axis.

2. Apparatus, as set forth in claim 1, wherein a pair of oppositely rotating feed drums are arranged so that each is located on an opposite longitudinally extending side of said conveyor and is positioned adjacent to said cutting disc for cooperating therewith in removing material from the support surface on one of said turntables, a covering extending along each of the sides of said conveyor adjacent said cutting disc and positioned between said feed drum associated with the same side of said conveyor and the material on the adjacent said turntable, said covering having slots extending therethrough, prongs secured to and extending outwardly from said feed drum through said slots in said covering, means for packing the removed material located on said conveyor and comprising a packer located in said discharge duct and having packing elements extending from the top to the bottom of said discharge duct for compressing the material and advancing it through said duct, and said prongs on said feed drum arranged to move material cut from the body of material on said turntables by said cutting disc into said discharge duct on said conveyor.

3. Apparatus, as set forth in claim 2, wherein said conveyor along with said cutting disc and feed drum is pivotally mounted about an axis spaced along its longitudinal axis from said cutting disc so that said conveyor can be pivoted over both of said turntables to a position where said cutting disc thereon is located close to the center of said turntable.

4. Apparatus, as set forth in claim 3, wherein said cutting disc is pivotally displaceable relative to the longtudinal axis of said conveyor in the plane of the supporting surface of said turntables, and said cutting disc can be locked in its pivotally displaced position as it removes material from one of said turntables.

5. Apparatus, as set forth in claim 3, wherein a second conveyor is positioned at the discharge end of said conveyor forming an extension of said conveyor, and said second conveyor is pivotally mounted at its end adjacent to the discharge end of said conveyor so that it can be displaced into a number of discharge positions for supplying the material removed from the turntables to different use or storage locations.

6. Apparatus for removing a pile of stalks and leaves located on the support surface of a rotatably driven turnatable and a conveyor pivotally displaceable across the support surface of said turntable, a cutting disc mounted on said conveyor and arranged to cut material from the pile of material on the support surface of said turntable, a discharge duct formed on said conveyor and arranged to receive and transport the material removed by said cutting disc, said conveyor along with its said cutting disc is arranged to be displaced from the periphery to the center of said turntable as said turntable rotates for removing the material located on the support surface, wherein the improvement comprises two said turntables disposed in side-by-side relationship with the adjacent peripheral surfaces of said turntables disposed in spaced relationship, said conveyor being longitudinally elongated and extending between the adjacent surfaces of said turntables, said conveyor being pivotally displaceable inwardly from the peripheral surface alternately over each of the support surfaces of said turntables, so that said conveyor and cutting disc can remove material from one said turntable while the other said turntable can be loaded, said conveyor extending from said turntable for moving the removed material to a selected disposal location, and said cutting disc comprises a pair of cutting discs located on said conveyor each associated with an opposite longitudinally extending side thereof, said cutting discs being located at the end of said conveyor which pivots inwardly over said turntables, the axis of rotation of each said cutting disc being disposed at an acute angle to the longitudinal axis of said conveyor, and a feed drum associated with each of said cutting discs so that said conveyor has a separate cutting disc and feed drum for removing the material from each of said turntables.

7. Apparatus, as set forth in claim 6, wherein a pair of parallel said discharge ducts are arranged on said conveyor extending in the longituindal direction thereof each from one of said feed drums toward the end of said conveyor opposite to the end containing said cutting discs.

* * * * *